(12) United States Patent
Shi

(10) Patent No.: US 8,160,224 B2
(45) Date of Patent: Apr. 17, 2012

(54) METHOD, APPARATUS AND SYSTEM FOR IMPLEMENTING CONFERENCE SERVICE

(75) Inventor: Youzhu Shi, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 742 days.

(21) Appl. No.: 12/276,991

(22) Filed: Nov. 24, 2008

(65) Prior Publication Data

US 2009/0080633 A1 Mar. 26, 2009

Related U.S. Application Data

(63) Continuation of application No. PCT/CN2007/070026, filed on May 17, 2007.

(30) Foreign Application Priority Data

| May 24, 2006 | (CN) | 2006 1 0081390 |
| Aug. 11, 2006 | (CN) | 2006 1 0112112 |
| Mar. 16, 2007 | (CN) | 2007 1 0089250 |

(51) Int. Cl.
 *H04M 3/42* (2006.01)
(52) U.S. Cl. ............... 379/202.01; 379/205.01; 455/416
(58) Field of Classification Search ............ 379/202.01, 379/203.01, 204.01, 205.01, 206.01, 201.01; 370/352; 455/416
See application file for complete search history.

(56) References Cited

U.S. PATENT DOCUMENTS

| 5,369,694 | A | 11/1994 | Bales et al. |
| 5,675,583 | A | 10/1997 | Bales et al. |
| 6,577,622 | B1* | 6/2003 | Schuster et al. ............ 370/352 |
| 7,027,577 | B2* | 4/2006 | Gourraud et al. ........ 379/202.01 |
| 7,526,281 | B2* | 4/2009 | Khartabil et al. ............ 455/416 |
| 2004/0152443 | A1 | 8/2004 | Koskinen et al. |
| 2004/0190702 | A1* | 9/2004 | Mayer et al. ............. 379/202.01 |
| 2006/0153352 | A1 | 7/2006 | Schmidt et al. |

FOREIGN PATENT DOCUMENTS

| CN | 1142720 A | 2/1997 |
| CN | 1522038 | 8/2004 |
| CN | 1522038 A | 8/2004 |
| CN | 1653433 | 8/2005 |
| DE | 102004026785 A1 | 1/2006 |
| EP | 1465386 A1 | 10/2004 |

(Continued)

OTHER PUBLICATIONS

Camarillo, G., et al., Ad-Hoc Conferencing in the Session Initiation Protocol (SIP) draft-camarillo-sipping-adhoc-conferencing-00.txt, IETF Standard-Working-Draft, Mar. 27, 2004, p. 1-8, XP015011475, Internet Engineering Task Force.

(Continued)

*Primary Examiner* — Thjuan K Addy

(74) *Attorney, Agent, or Firm* — Brinks Hofer Gilson & Lione

(57) ABSTRACT

An apparatus and a system for implementing the conference service is disclosed. The method includes: a conference initiator sends a conference operation message that carries conference information which includes conference initiator information and information of at least one conference participant, or includes information of more than one conference participant; adds more than one user terminal denoted by the conference information to the conference. With the present invention, only one operation is needed to set up a conference. The implementation of conference service is greatly simplified.

12 Claims, 5 Drawing Sheets

FOREIGN PATENT DOCUMENTS

WO    WO-2005057852    6/2005

OTHER PUBLICATIONS

Johnston, A., et al., Session Initiation Protocol Call Control—Conferencing for User Agents draft-ietf-sipping-cc-conferencing-07, IETF Standard-Working-Draft, Jun. 3, 2005, p. 1-42, XP002540781, Internet Engineering Task Force.

Mahy, R., et al., The Session Initiation Protocol (SIP) "Join" Header, IETF Standard-Working-Draft, Oct. 2004, p. 1-17, XP015009684, Internet Engineering Task Force.

Camarillo, G et al. "Ad-Hoc Conferencing in the Session Initiation Protocol (SIP) draft-camarillo-sipping-adhoc-conferencing-00.txt" The Internet Society. Mar. 27, 2004.

Mahy, R.et al. "The Session Protocol (SIP) 'Join' Header" The Internet Society. Oct. 2004.

Johnston, A. et al. "Session of Initiation Protocol Call Control—Conferencing for User Agents draft-iet-sipping cc-conferencing-07" The Internet Society. Jun. 3, 2005.

"Telecommunications and Internet Converged Services and Protocols for Advanced Networking (TISPAN); PSTN/ISDN Simulation Services; Conference (CONF); Protocol Specification" (clean version).ETSI. Dec. 2005.

"Telecommunications and Internet Converged Services and Protocols for Advanced Networking (TISPAN); PSTN/ISDN Simulation Services; Conference (CONF); Protocol Specification" (redlined version).ETSI. Dec. 2005.

Written Opinion of the International Searching Authority issued in corresponding PCT Application No. PCT/CN2007/070026; mailed Aug. 16, 2007.

Office Action issued in corresponding Chinese Patent Application No. 2007100892507; issued May 16, 2008.

Office Action issued in corresponding Chinese Patent Application No. 2007100892507; issued Apr. 3, 2009.

Office Action issued in corresponding European Patent Application No. 07 721 649.7; issued Jun. 30, 2010.

\* cited by examiner

METHOD, APPARATUS AND SYSTEM FOR IMPLEMENTING CONFERENCE SERVICE

CROSS-REFERENCE TO RELATED APPLICATIONS

This application is a continuation of International Application No. PCT/CN2007/070026, filed on May 17, 2007, which claims priority to Chinese Patent Application Nos. 200610081390.5, filed May 24, 2006; 200610112112.1, filed Aug. 11, 2006; and 200710089250.7; filed Mar. 16, 2007; all of which are incorporated herein by reference in their entireties.

FIELD OF THE INVENTION

The present invention relates to communication services and in particular to a method, an apparatus and a system for implementing the conference service.

BACKGROUND OF THE INVENTION

As packet technologies grow mature, traditional telecom networks that are based on circuit switching are developing towards broadband telecom networks that are based on packet switching, while the adoption of Session Initiation Protocol (SIP) as the call control signaling of a packet switched core network is one of the trends of technological development. For example, according to the researches on the Next Generation Network (NGN) done by standardization organizations like the International Telecommunication Union-Telecommunication Standardization Sector (ITU-T) and European Telecommunications Standards Institute (ETSI), in this new packet telecom network, new packet terminals, that is, SIP terminals, will gradually take the place of traditional telephone terminals.

The Telecommunications and Internet Converged Services and Protocols for Advanced Networking (TISPAN) under ETSI has opened a number of Work Items (WIs) to study the services provided to SIP terminals in the NGN system. For example, WI 03023 (DTS/TISPAN-03023-NGN-R1 NGN CONF) carries out researches on the conference (CONF) service, which enables a user to initiate, participate in and control a conversation involving multiple parties.

FIG. 1 shows a signaling procedure for implementing the conference service, which is specified in Draft ETSI TS <3023> V<0.0.19> (2005-12) of WI 03023. The signaling procedure includes the following steps:

S102: User A initiates a dialog to call a Public Switched Telephone Network/Integrated Services Digital Network (PSTN/ISDN) user.

S104-S128: A dialog is set up successfully between user A and the PSTN/ISDN user, and they start a conversation.

The interaction in Step S108 is to reserve resources and the interaction in step S116 is to set up the dialog.

S130: User A requests a conference by initiating a dialog to an Application Server (AS), a service control network element that processes the conference service.

S132-S148: The conference requested by user A is created successfully.

The interaction in step S136 is to create the conference.

S150: User A sends a SIP REFER message to the conference AS, inviting the PSTN/ISDN user conversing with user A to join the conference.

S152-S160: The SIP REFER arrives at the conference AS and the conference AS sends a SIP NOTIFY to notify user A of the reception of the SIP REFER.

The interaction in step S154a is to reserve resources for the new conference participant.

S162: The conference AS sends a SIP INVITE to the PSTN/ISDN user to initiate a dialog according to information carried in the received SIP REFER.

S164-S182: Because the PSTN/ISDN user is a traditional circuit switched domain user, the interworking between the circuit switched domain and the packet switched domain is processed by a Media Gateway Control Function (MGCF). Therefore, the SIP INVITE is sent to the MGCF, and the MGCF acts on behalf of the PSTN/ISDN user to create a dialog with the conference so that the PSTN/ISDN user can be added to the conference. Afterwards, the conference AS sends a SIP NOTIFY to notify user A that the action requested by the SIP REFER is successful.

The interaction in step S166 is to hand over an existing transmitting channel to a new Real-time Transport Protocol (RTP) dialog; the interaction in step S170a is to add the new conference participant to the conference; the interaction in step S182 is to hand over the existing transmitting channel to the new RTP dialog.

S184-S194: The MGCF releases the dialog denoted by the Dialog identifier set in the Replaces information in the SIP INVITE. This dialog is the one already set up between user A and the PSTN/ISDN user.

A detailed description of the above procedure is available in the related draft of WI 03023.

According to the foregoing procedure, a user needs to first create a conference and then invite other participants to the conference after the conference is successfully created. This conference implementation procedure is subject to the following disadvantages:

1. The steps are complex and the conference creation is inefficient.

Complex steps are required for user A to initiate a conference and add participants to the conference. User A needs to first request a conference via a message like SIP INVITE and then, after the conference is created successfully, invite a participant to join the conference via another message like SIP REFER.

2. Relations between conference and other services are not considered.

An already established conversation may trigger the application of many other services. The service control elements that process these services are already on the signaling path of the conversation. When the procedure shown in FIG. 1 is adopted to create a conference, the conference AS establishes two new dialogs respectively with user A and the MGCF and releases the conversation already established between user A and the MGCF. In this way, services triggered on the already established conversation are also released.

For example, because the terminal used by user A has no international call authority, user A uses a prepaid card to establish an international conversation and a service control element that processes prepaid services exist on the signaling path of the conversation. When user A initiates a conference call, because the already established conversation is released, the prepaid service control element does not exist on the signaling path of user A so that the conference is unsuccessfully created (due to the lack of international call authority), or user A may initiate international calls without a prepaid card.

For another example, in an already established conversation, or when the call of a conversation is initiated, user A activates a service, such as the advice of charge. After a conference is created, user A will not receive advice of charge from the network unless user A re-activates the advice of charge service when user A initiates the conference call or after the conference is created successfully.

User A, however, does not expect changes to the prior service experience but hopes to hold services already in application.

SUMMARY OF THE INVENTION

In view of the above needs, it is necessary to provide a method, an apparatus and a system for implementing the conference service.

A method for implementing the conference service according to an embodiment of the present invention includes:

sending, by a conference initiator, a conference operation message that carries conference information which includes information of the conference initiator and information of at least one conference participant, or includes information of more than one conference participant; and adding more than one user terminal denoted by the conference information to the conference.

An apparatus for implementing the conference service according to an embodiment of the present invention includes:

a conference initiating module, adapted to initiate a conference operation message that carries conference information which includes conference initiator information and information of at least one conference participant, or includes information of more than one conference participant; and a conference operating module, adapted to add more than one user terminal denoted by the conference information to the conference.

A system for implementing the conference service includes:

a first user terminal, adapted to initiate a conference operation message that carries conference information which includes information of the first user terminal and information of at least one second user terminal, or includes information of more than one second user terminal; and a network server, adapted to add the first user terminal and at least one second user terminal to the conference or add the more than one second user terminal to the conference according to instructions of the conference information.

DETAILED DESCRIPTION OF THE EMBODIMENTS

In the prior art, a user needs to first request a conference and then invite participants to join the conference. In embodiments of the invention, the two steps are combined into one so that participants are invited to join the conference simultaneously when a conference is requested. In this way, the procedure for creating a conference is simplified. In the prior art, two new calls are used respectively to request a conference and add a conference participant. In embodiments of the invention, the signaling path of the already established conversation is reused so that the creation of a conference is simplified.

Figure 1:
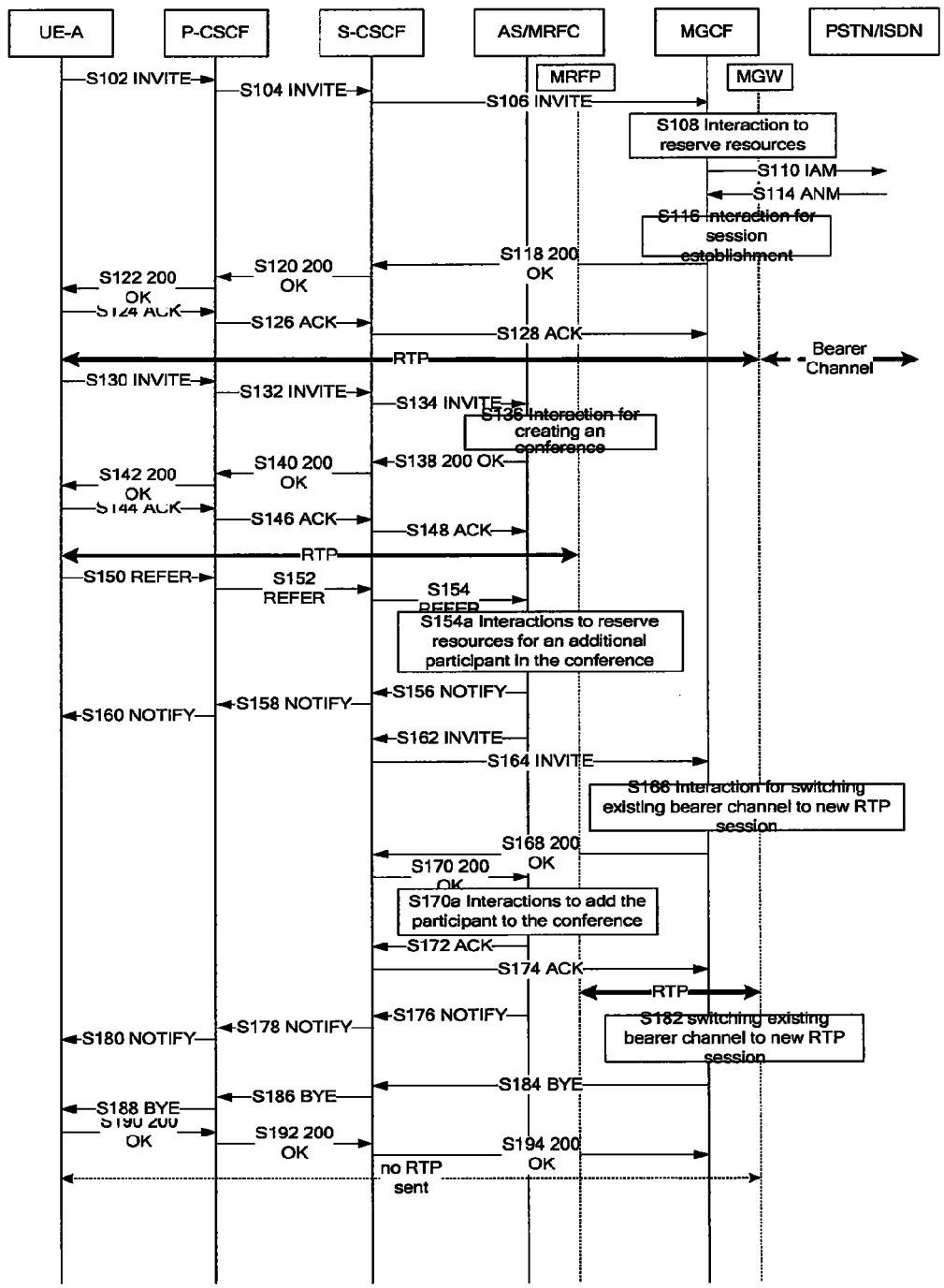
FIG. 1 shows a signaling procedure for implementing the conference service given by WI 03023.
Figure 2:
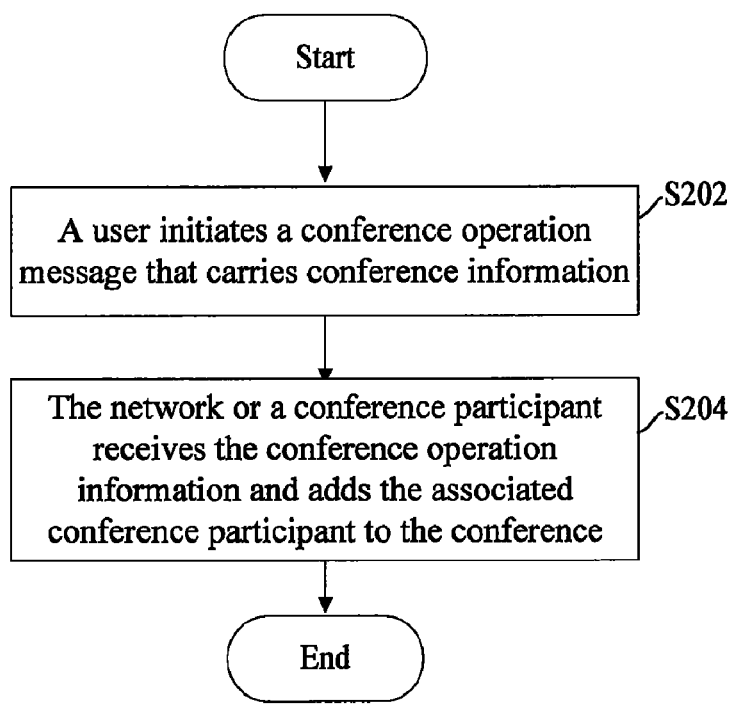
FIG. 2 shows a procedure for implementing the conference service according to an embodiment of the present invention.

FIG. 2 shows a procedure for implementing the conference service according to an embodiment of the present invention. As shown in FIG. 2, the method for implementing the conference service includes the following steps:

S202: A conference initiator sends a conference operation message, which carries information related to the requested conference, hereinafter referred to as conference information, such as conference initiator information and conference participant information, used to indicate which users will join in the conference.

In the embodiments of the present invention, the conference information includes information of more than one user. The more than one user may be one conference initiator and at least one conference participant, or more than one conference participant.

S204: The network server or the conference participant receives the conference operation message and adds the conference participant and/or conference initiator indicated by the conference information to the conference.

Figure 3:
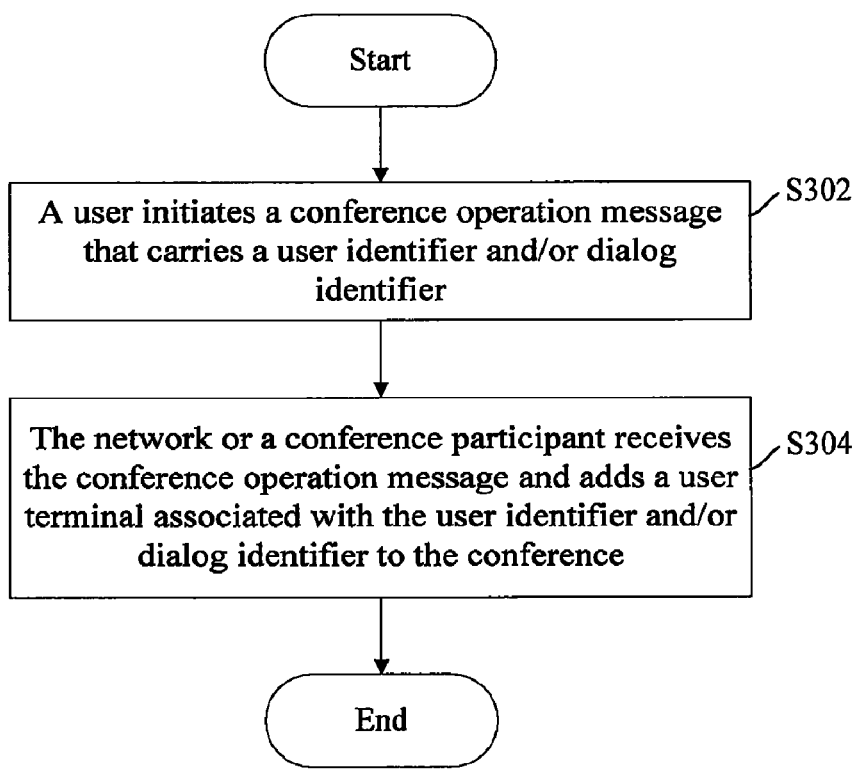
FIG. 3 shows a procedure for implementing the conference service according to another embodiment of the present invention.

FIG. 3 shows a procedure for implementing the conference service according to another embodiment of the present invention. As shown in FIG. 3, the method for implementing conference service includes the following steps:

S302: The conference initiator sends a conference operation message which carries a user identifier and/or dialog identifier associated with the conference participant.

The dialog identifier includes a Call-Id, a to-tag and a from-tag.

S304: The network server or the conference participant receives the conference operation message and adds the conference participant indicated by the user identifier and/or dialog identifier to the conference.

Optionally, the network server initiates a new call or redirects the call to the conference participant indicated by the user identifier and/or dialog identifier to add the conference participant to the conference.

Optionally, upon reception of the conference operation message from the conference initiator, the network server initiates a new call or redirects the call to the conference initiator to add the conference initiator to the conference; or the network server exchanges conference operation messages with the conference initiator to add the conference initiator to the conference.

Optionally, the conference participant or the home network element of the conference participant initiates a call to the conference initiator according to the conference operation message, and the conference initiator and conference participant indicated by the dialog identifier form a conference.

Optionally, a conference resource is requested before the network receives the operation message; or requested after the network receives the operation message.

Optionally, upon reception of the conference operation message from the conference initiator, the network server exchanges conference operation messages with the conference initiator to request a conference resource; or the network server initiates a new operation to request a conference resource.

Optionally, upon reception of the conference operation message from the conference initiator, the network server requests a conference resource according to a conference service identifier carried in the conference operation message or according to the information element name of the user identifier or dialog identifier associated with the conference participant carried in the conference operation message.

Optionally, the conference operation message includes a dialog identifier that needs to be associated with the conference and/or a charging identifier of the dialog associated with the dialog identifier.

Optionally, the conference operation message carries the signaling path of the dialog associated with the dialog identifier or the dialog identifier of the conference operation message is the dialog identifier associated with the conference participant carried in the conference operation message.

The conference operation message may be a SIP INVITE, a SIP REFER, a SIP SUBSCRIBE, or a Hyper Text Transport Protocol (HTTP) message.

Figure 4:
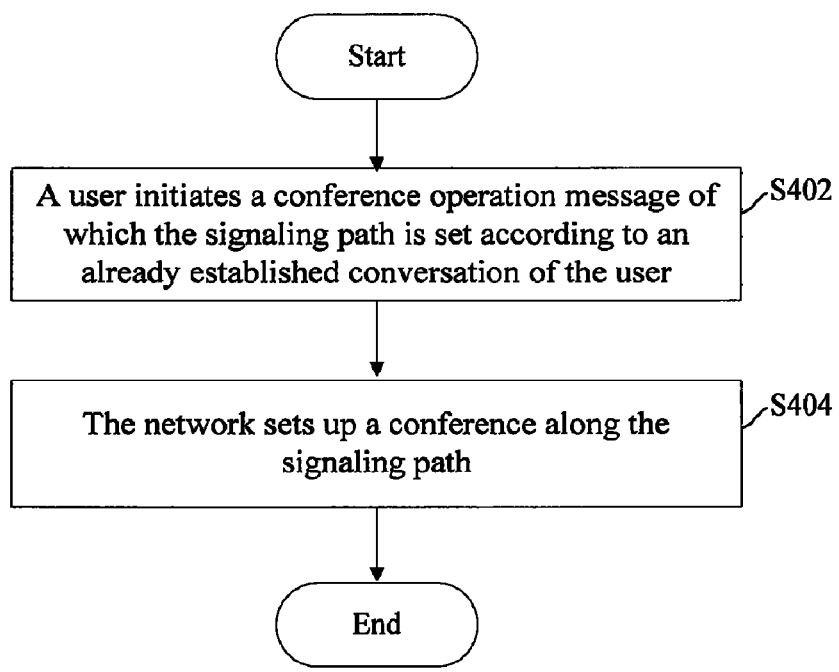
FIG. 4 shows a procedure for implementing the conference service according to another embodiment of the present invention.

FIG. 4 shows a procedure for implementing the conference service according to another embodiment of the present invention. As shown in FIG. 4, the method for implementing the conference service includes the following steps:

S402: The conference initiator or the network server initiates a conference operation message, which carries the call signaling path of an already established conversation of the user.

S404: The network server sets up a conference along the call signaling path.

Optionally, the conference operation message carries one or more user identifiers and/or one or more dialog identifiers of the conference participant to join the conference.

Optionally, the destination of the conference operation message is a conference service identifier, a conference resource identifier or a user identifier.

Optionally, the destination of the conference operation message is a conference service identifier, a conference resource identifier or a user identifier. When the destination of the conference operation message is a user identifier, the conference participant or the home network element of the conference participant initiates a call to the user associated with the user identifier according to requirements of the conference operation message so that the user and the conference participant form a conference.

Figure 5:
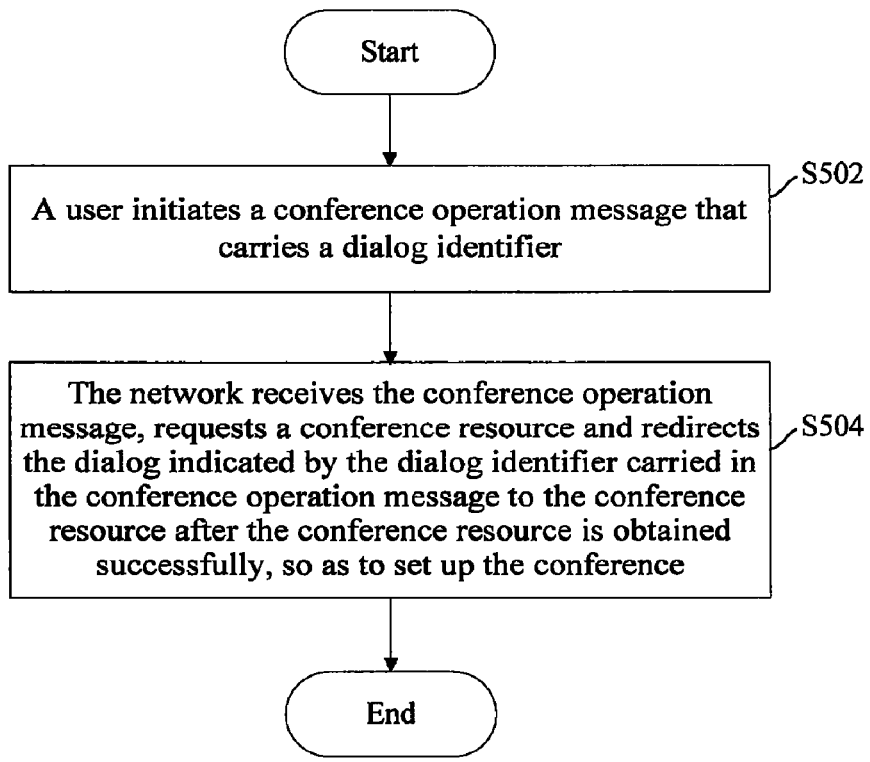
FIG. 5 shows a procedure for implementing the conference service according to another embodiment of the present invention.

FIG. 5 shows a procedure for implementing the conference service according to another embodiment of the present invention. As shown in FIG. 5, the method for implementing the conference service includes the following steps:

S502: The conference initiator sends a conference operation message which carries a dialog identifier to indicate a dialog.

S504: Upon reception of the conference operation message, the network server requests a conference resource and redirects the dialog indicated by the dialog identifier carried in the conference operation message to the conference resource after the conference resource is obtained successfully, so as to set up the conference.

Optionally, the conference resource is requested after the network server receives the conference operation message, or already requested successfully before the network server receives the conference operation message.

The dialog includes a dialog indicated by the dialog identifier and a dialog back to back with the dialog indicated by the dialog identifier.

Figure 6:
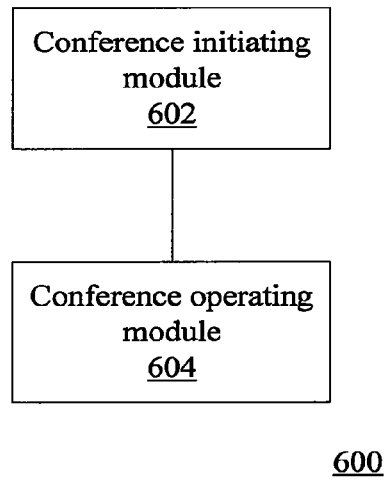
FIG. 6 shows the structure of an apparatus for implementing the conference service according to an embodiment of the present invention.

FIG. 6 shows the structure of an apparatus for implementing the conference service according to an embodiment of the present invention. As shown in FIG. 6, the apparatus 600 for implementing the conference service includes:

a conference initiating module 602, adapted to initiate a conference operation message which carries conference information.

In the embodiments of the present invention, each user terminal may have a conference initiating module 602 to initiate a conference operation message when needed so that the user terminal becomes a conference initiator.

In this embodiment, a conference operating module 604 is adapted to add the more than one user associated with the conference information carried in the conference operation message to the conference.

Normally, the conference operating module 604 is placed in a network server or a user terminal.

Figure 7:
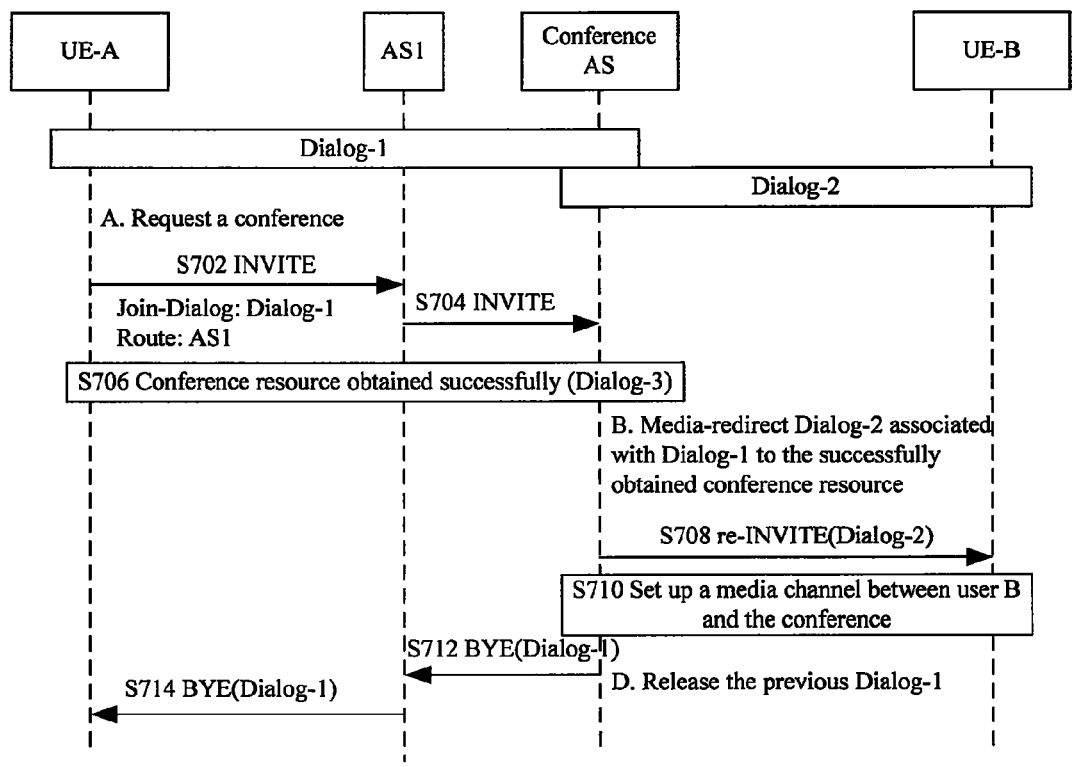
FIG. 7 shows a message flow in an embodiment of the present invention.
Figure 8:
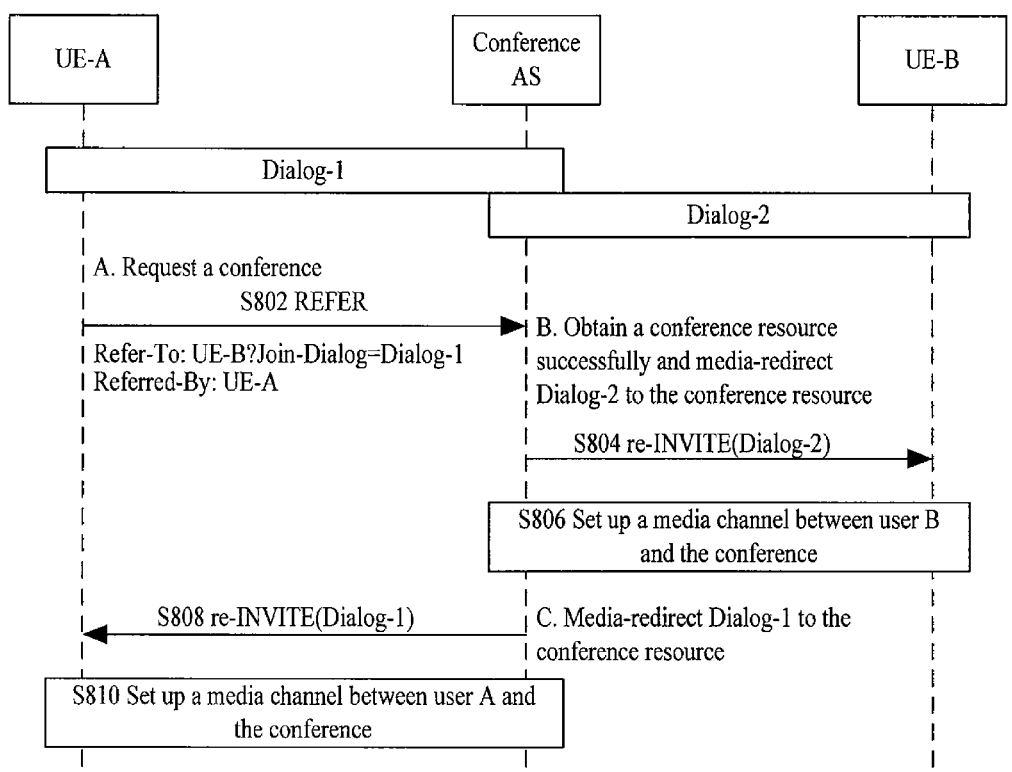
FIG. 8 shows a message flow in another embodiment of the present invention.

The following details the implementation procedure of the conference service according to embodiments of the present invention with reference to FIG. 7 and FIG. 8. It is understood that the flowcharts and texts are for better explanation of the technical solution of the present invention and are not necessarily a complete call and control procedure or exhaust all possible branch procedures.

FIG. 7 shows a message flow in an embodiment of the present invention. The scenario of this embodiment is: a conversation is already established between user A and user B and the conference AS is already added in the signaling path as a Back to Back User Agent (B2BUA) when the dialog is established. The dialog between user A and user B is identified as Dialog-1, of which the call identifier is "123@example.org", the to-tag is "xyz", and the from-tag "pdq". The dialog between user B and the conference AS is identified as Dialog-2. Dialog-1 and Dialog-2 are associated. The conversation between user A and user B also triggers the application of another service, which is processed by AS1. AS1 is also in the signaling path.

As shown in FIG. 7, the message flow includes the following steps:

S702: User A sends a SIP INVITE to initiate a call to request a conference.

In this embodiment, an example of the SIP INVITE message is as follows:

INVITE sip:conference-factory1@mrfc1.home1.net SIP/2.0

Join-Dialog: 123@example.org; to-tag=xyz; from-tag=pdq

Route: as1@home1.net

From the message, it is known that the destination address of the SIP INVITE is the conference service identifier "conference-factory1@mrfc1.home1.net", indicating that a conference resource is being requested.

The Join-Dialog header carries Dialog-1, indicating a request for combining the call (of user A to request a conference) and the already established dialog on the side of user A (the dialog denoted by Dialog-1, referred to as Dialog-1 hereinafter). This means a request for adding Dialog-1 to the call currently initiated to request a conference. The Join-Dialog header is a new header field defined in the embodiment of the invention.

In the Route header, the signaling path of the already established conversation is set. For example, the Route header carries the contact address of AS1 as1@home1.net or the contact addresses of other network elements existing in the signaling path of the already established conversation. Examples are omitted here.

In this step, the SIP INVITE may also take down the dialog identifier of Dialog-1. This means the dialog identifier of the SIP INVITE is set to Dialog-1. Thus, the SIP INVITE is routed in the network along the signaling path of Dialog-1 so that the signaling path of the already established conversation is reused.

S704: The SIP INVITE is sent to AS1 along the set signaling path. The AS1 forwards the SIP INVITE to the conference AS.

S706: The conference AS receives the SIP INVITE, requests a conference resource and sets up a conference channel with user A with the dialog identified as Dialog-3.

S708: The conference AS combines the newly established dialog (denoted by Dialog-3, hereinafter referred to as Dialog-3) and Dialog-1 according to the indication of Join-Dialog.

Afterwards, because Dialog-3 itself has requested a conference resource, a conference channel may be set up between user B associated with Dialog-1 and the conference resource. Specifically, because the conference AS exists in the signaling path between user A and user B as a B2BUA, after the conference AS obtains the dialog identifier "Dialog-2" associated with Dialog-1, the conference AS sends a SIP re-INVITE to user B, of which the dialog identifier is set to Dialog-2, so as to redirect the dialog identified as Dialog-2 that is already established by user B to the conference resource already obtained successfully.

S710: The conference channel between the conference resource and user B is set up successfully. The conference channel corresponds to Dialog-2. Now, a conference between user A and user B is created successfully.

S712: The conference AS sends a SIP BYE to release the prior dialog (Dialog-1).

S714: AS1 receives the SIP BYE and forwards the SIP BYE to user A.

According to the message flow in FIG. 7, user A only sends one SIP INVITE to complete the creation of a conference and the addition of a conference participant (user B in the embodiment) to the conference. In this process, although the already established dialog (Dialog-1) is released, the dialog between user A and the conference resource (Dialog-3) is routed by way of AS1 according to the set signaling path so that user A's already triggered service continues and the prior service experience of user A is retained. In addition, the dialog on the side of user B (denoted by Dialog-2, hereinafter referred to as Dialog-2) is redirected by media to the already obtained conference resource while the signaling path of Dialog-2 is not changed. Therefore, user B's already triggered service continues and the prior service experience of user A is retained.

In the embodiment of FIG. 7, when a conversation is already set up between user A and user B, the dialog on user B's side (Dialog-2) may be redirected to the conference resource while the dialog on user A's side (Dialog-1) may not be so redirected because the conference resource is not obtained yet when user A initiates the conference operation message to request a conference.

In practice, both Dialog-1 and Dialog-2 may be redirected to the conference resource to implement the conference service, as shown in FIG. 8.

FIG. 8 shows a message flow in another embodiment of the present invention. The scenario of this embodiment is similar to that of FIG. 7. Specifically, a conversation is already set up between user A and user B; the conference AS exists in the signaling path as a B2BUA; the dialog between user A and the conference AS is identified as Dialog-1; the dialog between user B and the conference AS is identified as Dialog-2.

As shown in FIG. 8, the message flow includes the following steps:

S802: User A sends a SIP REFER to the conference AS to request a conference.

An example of the SIP REFER message is as follows:
REFER sip:conference-factory1@mrfc1.home1.net SIP/2.0
Refer-To: <sip:user-b@home.net?Join-Dialog=123@example.org%to-tag=xyz%from-tag=pdq;method=INVITE>
Referred-By: <sip:user-a@home.net>

The message indicates that user A requests the conference AS to initiate a call with the dialog type as INVITE to user B so as to combine the call and the already established dialog (Dialog-1). This means user A requests adding Dialog-1 to the call currently initiated to request a conference.

In this embodiment, the initiator of SIP REFER is user A, of which the user identifier is "sip:user-a@home.net" while user B is identified as "sip:user-b@home.net". In addition, Joint-Dialog is carried in the Refer-To header of the SIP REFER message. Alternatively, Join-Dialog may be an independent header carried in the SIP REFER message.

S804: The conference AS receives the SIP REFER and initiates a call to user B.

In the process, the conference AS needs to first request a conference resource, which then initiates a call to user B. Because a dialog identified as Dialog-2 already exists between the conference AS and user B, the conference AS only needs to send a SIP re-INVITE message to user B and set the dialog identifier of the message to Dialog-2 to media-redirect dialog-2 to the already obtained conference resource.

S806: A media channel is set up between user B and the conference AS.

S808: The conference AS combines the currently initiated conference call (Dialog-2) and Dialog-1 according to the indication of the Join-Dialog header in the SIP REFER.

Because Dialog-2 itself includes a successfully obtained conference resource, this step only needs to set up a conference channel between user A associated with Dialog-1 and the conference resource. Specifically, the conference AS sends a SIP re-INVITE to user A, of which the dialog identifier is set to Dialog-1, to request that user A's already established dialog (Dialog-1) be media-redirected to the already obtained conference resource.

S810: A media channel is setup between user A and the conference AS.

In the embodiment of FIG. 8, because the already established dialog (Dialog-1) is media-redirected to the already obtained conference resource, the already established signaling path is not changed so that services of user A and user B that are already triggered are retained.

By comparing FIG. 7 and FIG. 8, we can find great differences between the two embodiments in requesting a conference resource. In the embodiment shown in FIG. 7, the conference operation message initiated by user A is a conference request call and the conference AS exchanges conference operation messages with user A to obtain a conference resource. This means that the conference resource acts as a terminator of the call. In the embodiment shown in FIG. 8, however, user A initiates a SIP REFER message, the interaction of which is not able to get a conference resource; the conference AS needs to initiate a conference resource request actively according to the SIP REFER, and then the conference resource acts as an originator to establish a conference channel with the user.

In the foregoing two embodiments, the conference AS is located in the signaling path of the conversation already set up between user A and user B. In practice, the conference AS may also not exist in the already established signaling path at the beginning. For example, another AS2 exists in the already established signaling path as a B2BUA and after the AS2 receives an INVITE or REFER from user A, the AS2 initiates a conference request call to the conference AS to obtain a conference resource and then the AS2 uses this conference resource as an originator to send redirect requests to user B and user A. For another example, the signaling path of the dialog for setup of a conference channel between the conference AS and user A/B may be set in the message sent from user A to the conference AS so that the message is routed along the already established call signaling path.

It is understood that the message flows given in the foregoing two embodiments may also be combined. For example, user A sends a SIP INVITE without carrying the signaling path of an already established conversation. After the conference resource is obtained and Dialog-3 is established, the conference AS (existing in the already established signaling path) or the foregoing AS2 (when the conference AS does not exist in the already established signaling path) uses the conference resource as an originator to send redirect requests respectively to user B and user A, and then Dialog-3 is released.

In specific implementation, user A may send a conference request in various ways so long as user A expresses a request for conference and the message carries the dialog identifier and/or user identifier of the conference participant.

For example, user A may send a SIP SUBSCRIBE to the conference AS. An example of the SIP SUBSCRIBE message is as follows:
SUBSCRIBE sip:conference-factory1@mrfc1.home1.net SIP/2.0
Join-Dialog: 123@example.org;to-tag=xyz; from-tag=pdq When the conference AS receives the SIP SUBSCRIBE, the conference AS executes a procedure similar to that shown in FIG. 8. The conference AS first obtains a conference resource, and then uses the conference resource as an originator to redirect Dialog-1 and Dialog-2 to the conference resource so that both user A and user B set up a conference channel with the conference resource.

For another example, user A may send a Hyper Text Transport Protocol (HTTP) message to the conference AS to request a conference. The HTTP message may describe the conference request and the dialog identifier used for joining the conference by using the eXtended Markup Language (XML).

In the foregoing two embodiments, user A acts as the conference initiator, which requests a conference resource after setting up a conversation with another user (the conference participant) so as to create a conference based on the conversation.

In practice, this is only one scenario where user A wishes to set up a conference with another user. For description purposes, this scenario is referred to as scenario 1 herein. There are many other scenarios where user A wishes to create a conference with other users, for example:

Scenario 2: User A (conference initiator) calls user B or other users (conference participants), wishing to set up a conference with these users.

Scenario 3: User A has established conversations with user B and user C respectively and wishes to set up a three-party conference of user A, user B and user C on the basis.

Scenario 4: User A and user B are conversing, and user A calls user C and wishes to establish a three-party conference.

Scenario 2 differs from scenario 1 in that no conversation is established between user A and user B, which means there is no existing dialog identifier.

If the method shown in FIG. 7 is used to process scenario 2, user A initiates a conference request call. An example of the message sent by user A is as follows:
INVITE sip:conference-factory1@mrfc1.home1.net SIP/2.0
Join-User: <sip:user-b@home.net>

The conference AS receives the SIP INVITE and establishes a conference channel with user A and then the conference AS uses the obtained conference resource to initiate a call to user B (with the user identifier as sip:user-b@home.net) to set up a conference channel with user B. The Join-User header in the message indicates adding user B to the current call (used by user A to request a conference).

If the method shown in FIG. 8 is used to process scenario 2, user A initiates a SIP REFER message. An example of the message is as follows:
REFER sip:conference-factory1@mrfc1.home1.net SIP/2.0
Refer-To: <sip:user-b@home.net?Join-User=sip:user-a@home.net; method=INVITE>

When the conference AS receives the SIP REFER, the conference AS first obtains a conference resource successfully and then uses the conference resource to initiate a call to user B (user identifier sip:user-b@home.net) to establish a conference channel with user B. The Join-User header in the message indicates adding user A (user identifier sip:user-a@home.net) to the current call (initiated by the conference resource to user B). Then the conference AS uses the conference resource to initiate a call to user A to establish a conference channel with user A. If user A calls more users and wishes to set up a conference with the users, the Join-User header may carry multiple user identifiers.

Scenario 3 differs from scenario 1 in that user A has established a conversation with user C in addition to the conversation with user B.

If the method shown in FIG. 7 is used to process scenario 3, user A initiates a conference request call. An example of the message sent by user A is as follows:
INVITE sip:conference-factory1@mrfc1.home1.net SIP/2.0
Join-Dialog: 123@example.org;to-tag=xyz; from-tag=pdq
Join-Dialog: 789@example.org;to-tag=mno; from-tag=abc Where, "123@example.org", "xyz" and "pdq" denote the identifier of the dialog established between user A and user B; 789@example.org, "mno" and "abc" denote the identifier of the dialog established between user A and user C. In this case, the Join-Dialog header carries multiple dialog identifiers.

Upon reception of the SIP INVITE, the conference AS sets up a conference channel with user A and then redirects user B and user C respectively to the already successfully obtained conference resource.

If the method shown in FIG. 8 is used to process scenario 3, user A initiates a SIP REFER, where the Join-Dialog header carries two dialog identifiers directed respectively to user B and user C.

The three-party conference in scenario 3 is sometimes regarded as a unique conference service in the communication field, for which an independent three-party conference service identifier may be used. In an embodiment of the present invention, the conference service identifier includes the three-party conference service identifier, which is carried in the INVITE or REFER message initiated by user A. An example of the message is as follows:
 INVITE sip:3pty@mrfc1.home1.net SIP/2.0
 Join-Dialog: 123@example.org;to-tag=xyz;from-tag=pdq
 Join-Dialog: 789@example.org;to-tag=mno;from-tag=abc Where, "sip:3pty@mrfc1.home1.net" is the three-party conference service identifier.

Scenario 4 is a hybrid of scenario 1 and scenario 2.

If the method shown in FIG. 7 is used to process scenario 4, user A initiates a conference request call. An example of the message sent by user A is as follows:
 INVITE sip:conference-factory1@mrfc1.home1.net SIP/2.0
 Join-User: <sip:user-c@home.net>
 Join-Dialog: 123@example.org;to-tag=xyz; from-tag=pdq The SIP INVITE carries both the Join-User header (with the identifier of user C) and the Join-Dialog header (with the identifier of the dialog established between user A and user B).

If the method shown in FIG. 8 is used to process scenario 4, user A initiates a SIP REFER, which carries both Join-User and Join-Dialog. In the foregoing implementations, the network receives a conference operation message and requests a conference resource according to the conference service identifier carried in the conference operation message (if no conference resource is obtained yet). That is, the network uses the conference service identifier as the conference resource request identifier and adds the conference participant associated with the user identifier and/or conference identifier carried in the conference operation message so as to complete the conference operation. The present invention also allows using another information element in the conference operation message as the conference resource request identifier. When this is applied, scenario 4 is implemented as follows:

User A initiates a SIP REFER, which carries only a Join-Dialog header. An example of the message is as follows:
 REFER sip:user-c@home.net SIP/2.0
 Refer-To: <sip:user-a@home.net?Join-Dialog=123@example.org%to-tag=xyz%from-tag=pdq;method=INVITE>

The SIP REFER carries both the identifier of user C and the identifier of the dialog established between user A and user B. The difference lies in that the user-c identifier is recorded in the Request-Uniform Resource Identifier (Request-URI) of the SIP REFER while in the foregoing implementation, the Request-URI carries a conference service identifier or conference resource identifier.

The SIP REFER is sent to user C. When user C's terminal or network server that can process the REFER message receives the message, user C's terminal or network server sends a SIP INVITE to user A. An example of the SIP INVITE is as follows:
 INVITE sip:user-a@home.net SIP/2.0
 Join-Dialog: 123@example.org;to-tag=xyz;from-tag=pdq Upon reception of the SIP INVITE, the terminal or home network element of user A parses the Join-Dialog header to know that user C wants to join the dialog already established between user A and user B. Then user A's terminal or home network element requests a conference resource to create a three-party conference with user B and user C. This means the Join-Dialog header not only carries the dialog identifier associated with the conference participant but also indicates a request for a conference resource. With this method, user A only needs to initiate a SIP REFER to set up a three-party conference. In addition, in the above example, the INVITE that triggers a conference operation is a message flow following the execution of the SIP REFER initiated by user A (the conference initiator). An embodiment of the present invention allows a subsequent message flow following the execution of a conference operation message after the conference operation message is initiated by the conference initiator. The network server or user terminal does not carry out the conference operation until reception of subsequent message to add the conference initiator or conference participant to the conference via a new call or redirection. From the above description, it is known that the procedures shown in FIG. 7 and FIG. 8 are also applicable to scenarios 2, 3 and 4. This means embodiments of the present invention provide a universal method for implementing the conference service.

It should be understood that when user A sets up a conversation with user B through a conference call, the prior service experience of a direct conversation between user A and user B (except the conference service experience) should not be changed. When a direct dialog is established between user A and user B, the identifiers of user A and user B are checked by the network as the caller identifier and callee identifier. For example, the network checks whether a dialog is allowed to set up. Therefore, when a conversation is set up by means of a conference, the network also needs to perform a similar check on the Join-User header.

It should be made clear that in the embodiment shown in FIG. 7, the conference channel established between user A and the conference resource is a new dialog (Dialog-3). Although Dialog-3 passes the call signaling path of the already established dialog of user A (Dialog-1), to retain the prior service experience, a network element located in the call signaling path is needed to associate the two dialogs so that Dialog-3 becomes a succession of Dialog-1. In practice, there may be two association modes, implicit association and explicit association. Implicit association means the network element associates the dialog identifier carried in the Join-Dialog header with the established dialog identifier. Explicit association means user A sets a dialog identifier in the SIP INVITE message when user A initiates a conference request call to indicate that the current call is to be associated with the dialog denoted by the dialog identifier.

The SIP INVITE initiated by user A to request a conference may also indicate that the charging of the call is a succession of the charging of another dialog. That is, dialog related charging information (usually recorded in the P-Charging-Vector header) in the SIP INVITE is set to the charging identifier of the already existing dialog (Dialog-1), such as the IMS charging ID (ICID). Or, after the above network element receives the SIP INVITE and associates the two dialogs, the network element sets the dialog related charging information in the SIP INVITE to the charging identifier of the already existing dialog.

It should be understood that in all the foregoing embodiments, a conference resource is requested after user A initiates a conference request and the destination of the conference operation message initiated by user A is a conference service identifier (conference-factory1@mrfc1.home1.net or 3pty@mrfc1.home1.net). In practice, an embodiment of the present invention is also applicable when a conference resource is already obtained before user A initiates a conference request. In this embodiment, the conference resource may be requested by user A, for example, user A already sets up a conference channel, or the conference resource may not be requested by user A. In this case, the destination of the conference operation initiated by user A is the identifier of the already obtained conference resource, for example, conference1@mrfc1.home1.net. The conference operation message may also carry the Join-User and Join-Dialog headers described in the foregoing embodiments. Then a new call is initiated or the call is redirected to the user terminals associated with the user identifier or dialog identifier set in the headers to add the users to the conference. Of course, the conference service identifier may not be the destination identifier of the conference operation message, for example, carried in another information element rather than in the Request-URI of the conference operation message.

It should be understood that the conference information recorded in the Join-User and Join-Dialog headers is only a logical definition, a SIP information element that carries the user identifier or dialog identifier associated with a conference participant and further indicates a conference resource request. In addition to being defined as a header, the conference information may also be a message entity application in the SIP message entity. In a specific SIP protocol, the conference information may be a succession or extension to a prior header or message entity application in the SIP protocol. For example, in the implementation of the foregoing scenario 4, the identifier of the conference participant user C is carried in a Request-URI. The conference information may also be a new header or message entity application extended in the SIP protocol. In addition, the conference information may be two independent headers or message entity applications that respectively carry the user identifier and the dialog identifier. The conference information may also be one header or message entity application that carries both the user identifier and the dialog identifier which are differentiated by parameters. Further, when a SIP message carries more than one user identifier or dialog identifier to add the conference participants associated with the user identifiers and the dialog identifiers to the conference, different headers or message entity applications may be used to carry these user identifiers or dialog identifiers. For example, one header carries dialog 1 and another header carries dialog 2. This means the Join-User or Join-Dialog information element is a uniform name for headers or message entity applications in a SIP protocol that carry user identifiers or dialog identifiers associated with conference participants. Taking the implementation of the foregoing scenario for example, user A initiates a REFER as follows:

REFER sip:user-c@home.net SIP/2.0
Refer-To: <sip:user-a@home.net?Join=123@example.org%to-tag=xyz%from-tag=pdq; Call-Id=789@example.org;From=sip:user-a@home.net%tag=abc;To=sip:user-c@home.net%tag=mno;method=INVITE>

In the above example message, dialog identifiers associated with conference participants are respectively the identifier of the dialog between user A and user B and the identifier of the dialog between user A and user C. The identifier of the dialog between user A and user B is carried in a Join header (as in the prior art). The identifier of the dialog between user A and user C is carried jointly by the Call-Id, From and To headers. This means the two dialog identifiers of the two conference participants are carried respectively by different information elements. The REFER message is sent to user C. User C's terminal or network element that can process the REFER message receives the message and sends an INVITE to user A:

INVITE sip:user-a@home.net SIP/2.0
Join: 123@example.org;to-tag=xyz;from-tag=pdq
Call-Id: 789@example.org
From: sip:user-a@home.net;tag=abc
To: sip:user-c@home.net;tag=mno It is seen that the dialog identifier of the INVITE message itself is the identifier of the dialog already established between user A and user C. This means the INVITE is a re-INVITE. Upon reception of the INVITE, user A's terminal or home network element parses the Join header to know that user C wants to join the dialog already set up between user A and user B. User A's terminal or home network element then requests a conference resource and create a three-party conference with user B and user C. In the solution provided by embodiments of the present invention, when a conference is started, the network server adds the conference participants to the conference directly according to the conference information carried in the conference operation message. Therefore, the conference initiator needs to perform only one operation to create a conference. For the conference initiator, the procedure for implementing the conference service is greatly simplified. Moreover, the conference call between the conference resource and a user is routed along the signaling path of the already established conversation.

Because the network sets up a conference along an already established signaling path, or the network redirects the dialog denoted by the dialog identifier carried in the conference operation message to the conference resource after the conference resource is obtained successfully to set up a conference, the conference can continue the application of services triggered by the previous conversation so that the prior service experience is retained.

Apparently, all modules or steps in embodiments of the present invention may be implemented by universal computing apparatuses. For example, they may be placed in one computing apparatus in a centralized manner or distributed in a network made up of multiple computing apparatuses. Optionally, the modules or steps may be implemented by executable program codes in the computing apparatus. The program codes may be recorded in a storage device and executed by the computing apparatus. Or, the modules or steps may be made into different integrated circuit modules. Or, multiple modules or steps thereof may be implemented in one integrated circuit module. This means embodiments of the present invention are not limited to specific combinations of hardware and software and these variations in the embodiments are apparent to those skilled in the art.

An embodiment of the present invention provides a system for implementing the conference service, including:

a first user terminal, adapted to initiate a conference operation message that carries conference information, which includes information of the conference initiator and information of at least one conference participant, or includes information of more than one conference participant.

The conference participant information includes at least one of the following types of parameters:

user identifier, adapted to denote a conference participant;
dialog identifier, adapted to denote a dialog where a conference participant is engaged; and
a network server, adapted to add more than one user terminal to the conference according to instructions of the conference information. Specifically, the network server adds the first user terminal and a second user terminal associated with at least one conference participant to the conference, or the network server adds second user terminals associated with more than one conference participant to the conference.

The network server is further adapted to determine the conference participant according to the user identifier and/or the dialog identifier and add a second user terminal of the conference participant to the conference by initiating a new call or redirecting the call to the conference participant.

The network server is further adapted to add the first user terminal to the conference by exchanging conference operation messages with the first user terminal, or by initiating a new call, or by redirecting the call.

The network server is further adapted to exchange messages with the first user terminal to request a conference resource required by the conference, or initiate a new operation to request a conference resource required by the conference.

The network server is a conference application server.

Although the technical scheme of the present invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

What is claimed is:

1. A method for implementing the conference service, comprising:
   receiving a conference operation message initiated by a conference initiator which carries conference information, the conference information indicates at least one user that joins in the conference, wherein the conference information comprises a dialog identifier, which denotes an established dialog where the at least one user that joins in the conference is engaging;
   deciding the at least one user that joins in the conference according to the dialog identifier;
   requesting a conference resource according to the conference operation message; and
   redirecting the established dialog indicated by the dialog identifier to the conference resource, so as to add the at least one user denoted by the conference information to the conference.

2. The method of claim 1, wherein the process of redirecting the established dialog indicated by the dialog identifier to the conference resource comprises:
   initiating, by the network server, a redirected call to the user that joins in the conference, to add the at least one user that joins in the conference to the conference; or
   initiating, by a conference participant, a redirected call to the network server, to joins the conference.

3. The method of claim 1, further comprising: the conference resource is requested, before or after the network server receives the conference operation message.

4. The method of claim 3, further comprising:
   exchanging, by the network server, conference operation messages with the conference initiator; or
   initiating a new operation, upon the reception of the conference operation messages, to request the conference resource.

5. The method of claim 1, further comprising:
   setting up, by the network server, a conference along a signaling path indicated by the dialog identifier or a signaling path of the already established conversation.

6. The method of claim 5, wherein the dialog identifier further comprises the dialog indicated by the dialog identifier including the dialog and the back-to-back dialog indicated by the dialog identifier.

7. The method of claim 1, wherein the conference operation message further comprises a charging identifier corresponding to the established dialog indicated by the dialog identifier.

8. The method of claim 1, wherein the dialog identifier comprises a Call-Id, a to-tag and a from-tag.

9. The method of claim 1, wherein the conference operation message comprises at least one type of the following messages: SIP INVITE message, SIP REFER message, SIP SUBSCRIBER message, and HTTP message.

10. An apparatus for implementing conference service, comprising:
    a conference initiating module, adapted to receive a conference operation message initiated by a conference initiator which carries conference information, the conference information indicates at least one user that joins in the conference, wherein the conference information comprises a dialog identifier, which denotes an established dialog where the at least one user that joins in the conference is engaging; and
    a conference operating module, adapted to decide the at least one user that joins in the conference according to the dialog identifier, request a conference resource according to the conference operation message, and redirect the established dialog indicated by the dialog identifier to the conference resource, so as to add the at least one user to the conference according to the conference information.

11. The apparatus of claim 10, wherein the conference operation message further comprises a signaling path indicated by the dialog identifier, or a signaling path of the already established conversation; and
    the conference operation module is further adapted to set up the conference along the signaling path indicated by the dialog identifier or the signaling path of the already established conversation.

12. The apparatus of claim 10, the apparatus is a conference application server.

* * * * *